(12) United States Patent
Ricard

(10) Patent No.: US 9,291,498 B2
(45) Date of Patent: Mar. 22, 2016

(54) DETECTION CIRCUIT WITH ANTI-BLOOMING CIRCUIT

(75) Inventor: Nicolas Ricard, Coublevie (FR)

(73) Assignee: SOCIETE FRANCAISE DE DETECTEURS INFRAROUGES—SOFRADIR, Chatenay Malabry (FR)

( * ) Notice: Subject to any disclaimer, the term of this patent is extended or adjusted under 35 U.S.C. 154(b) by 734 days.

(21) Appl. No.: 13/302,680

(22) Filed: Nov. 22, 2011

(65) Prior Publication Data

US 2012/0126101 A1    May 24, 2012

(30) Foreign Application Priority Data

Nov. 22, 2010   (FR) .................................... 10 04535

(51) Int. Cl.
*H01L 27/00*   (2006.01)
*G01J 1/44*   (2006.01)
*G01J 1/02*   (2006.01)

(52) U.S. Cl.
CPC .... *G01J 1/44* (2013.01); *G01J 1/02* (2013.01); *G01J 1/0228* (2013.01)

(58) Field of Classification Search
CPC .................. H01L 27/14609; H01L 27/14614; H04N 5/359; H04N 5/3591; H04N 5/3592; G01J 1/02; G01J 1/0228

USPC .................. 250/208.1; 257/223; 348/314
See application file for complete search history.

(56) References Cited

U.S. PATENT DOCUMENTS

| | | | |
|---|---|---|---|
| 4,935,618 A | 6/1990 | Naito | |
| 6,197,503 B1 * | 3/2001 | Vo-Dinh et al. | 435/6.11 |
| 8,597,999 B2 * | 12/2013 | Baumgartner | 438/283 |
| 2004/0036784 A1 * | 2/2004 | Bock | 348/308 |
| 2004/0227831 A1 * | 11/2004 | Storm et al. | 348/294 |
| 2010/0123504 A1 * | 5/2010 | Lauxtermann et al. | 327/331 |
| 2010/0164594 A1 * | 7/2010 | Fitzi | 327/336 |
| 2011/0068860 A1 * | 3/2011 | Baud | 330/7 |
| 2013/0134298 A1 * | 5/2013 | Maltere | G01J 1/18 250/214.1 |

FOREIGN PATENT DOCUMENTS

| | | |
|---|---|---|
| DE | 38 31 409 A1 | 10/1989 |
| EP | 2 037 241 A1 | 3/2009 |
| EP | 2 178 288 A1 | 4/2010 |

* cited by examiner

*Primary Examiner* — Georgia Y Epps
*Assistant Examiner* — Kevin Wyatt
(74) *Attorney, Agent, or Firm* — Oliff PLC

(57) ABSTRACT

The detection circuit comprises a photodiode connected to a readout circuitry. The photodiode and readout circuitry are connected by means of a transistor arranged to operate as a closed switch when the readout circuitry biases the photodiode in a predefined range and to operate as an open switch in the other cases.

20 Claims, 1 Drawing Sheet

DETECTION CIRCUIT WITH ANTI-BLOOMING CIRCUIT

BACKGROUND OF THE INVENTION

The invention relates to a detection circuit comprising a photodiode coupled to a readout circuitry.

STATE OF THE ART

In the field of detection devices, it is commonplace for a photodetector to be associated with a readout circuit. The photodetector delivers a signal representative of the observed scene and this signal is analysed by the read circuit.

Biasing of the photodetector is obtained by means of the substrate voltage imposed on a first terminal of the photodetector and by means of a reference voltage imposed on the second terminal of the photodetector by a readout circuitry of capacitive transimpedance amplifier type.

However, detection circuits which do not present satisfactory operation due to the hazards of the production method are commonly observed. Furthermore, when the photodetectors are integrated in a matrix, it is also commonplace to observe an impairment of the characteristics of the detection circuits in proximity to a non-functional detection circuit.

OBJECT OF THE INVENTION

It is observed that a requirement exists to provide a readout circuit that is more robust with respect to unscheduled events occurring in operation. For this, it is sought in particular to provide a circuit in which the photodiode and readout circuitry are connected by means of a transistor arranged to operate as a closed switch when the readout circuitry biases the photodiode in a predefined range and to operate as an open switch in the other cases.

BRIEF DESCRIPTION OF THE DRAWINGS

Other advantages and features will become more clearly apparent from the following description of particular embodiments of the invention, given for non-restrictive example purposes only and represented in the appended drawings, in which.

DESCRIPTION OF PREFERRED EMBODIMENTS OF THE INVENTION

Figure 1:
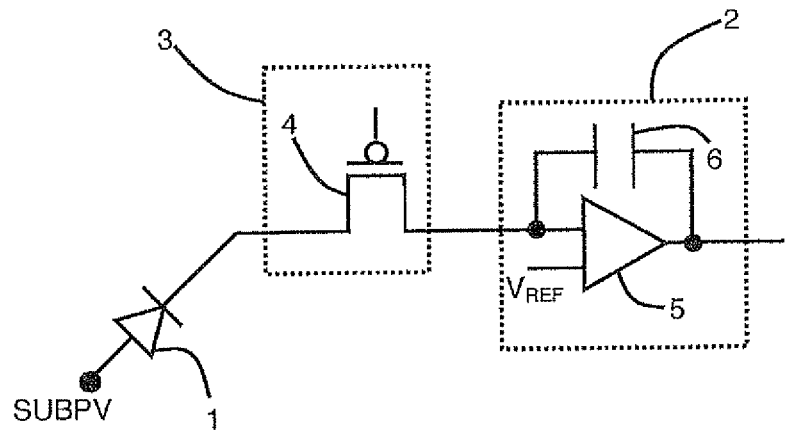
FIGS. 1 and 2 represent embodiments of detection circuits provided with an anti-blooming module, in schematic manner.
Figure 2:
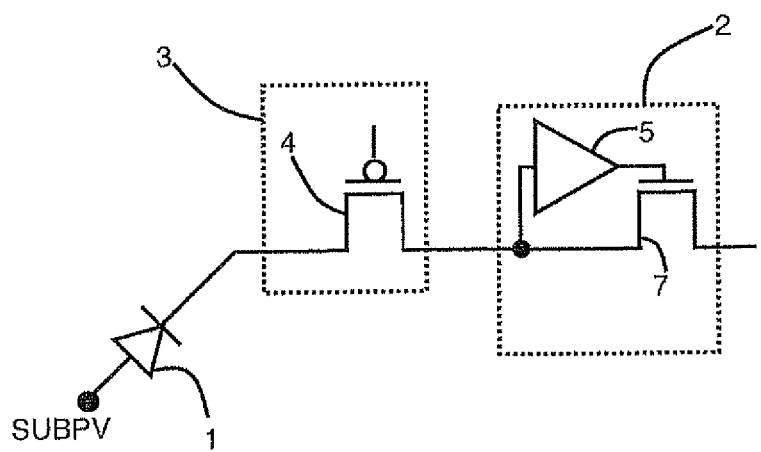

As illustrated in FIGS. 1 and 2, the detection circuit comprises a photo-detector 1 which is connected to a readout circuitry 2. Photodetector 1 is for example a PIN type or NIP type photodiode. In the photodiode, the N-type area forms the cathode whereas the P-type area forms the anode.

Depending on the embodiments, readout circuitry 2 is a capacitive trans-impedance amplifier (CTIA) as illustrated in FIG. 1 or a buffered direct injection (BDI) circuitry as illustrated in FIG. 2. Readout circuitry 2 imposes a reference voltage $V_{REF}$, on its input terminal, for the purposes of biasing photodetector 1.

An anti-blooming circuit 3 is integrated between readout circuitry 2 and photo-detector 1. Anti-blooming circuit 3 comprises a transistor 4 which couples photodetector 1 to readout circuitry 2. The current flowing between photo-detector 1 and readout circuitry 2 flows through transistor 4. Anti-blooming circuit 3 fixes the voltage of the second terminal of photodetector 1 by means of reference voltage $V_{REF}$ present at the input of readout circuitry 2.

A first electrode of transistor 4 is coupled to readout circuitry 2. A second electrode of transistor 4 is coupled to the second terminal of photodetector 1. Photodetector 1 and readout circuitry 2 are thus connected by means of transistor 4.

In a particular embodiment, anti-blooming module 3 is formed by transistor 4.

Photodetector 1 is reverse-biased under conditions which enable generation of a current representative of the observed scene. If photodetector 1 is a photodiode, the photodiode is reverse-biased and acts as a current generator.

The first terminal of photodetector 1 is coupled to a biasing node which fixes the photodetector voltage SubPV. Biasing of the photodetector is obtained by means of photodetector voltage SubPV imposed on the first terminal of the photodetector and by means of a voltage imposed on the second terminal of the photodetector from reference voltage $V_{REF}$ imposed by readout circuitry 2. These two voltages define the voltage difference between the anode and cathode of the photodetector and therefore the biasing conditions of the photodetector.

Under normal operating conditions of the device, the photodiode is biased in a precise voltage range. This range ensures for example reverse biasing of the photodetector and/or conversion of the observed scene into an analysable representative signal. If substrate voltage SubPV is fixed, this imposes an accessible range and/or a forbidden range for reference voltage $V_{REF}$ originating from readout circuitry 2.

The voltage applied to the cathode is advantageously very slightly higher than that applied to the anode in order to obtain reverse biasing of the photodetector. In advantageous manner, the voltage difference between the terminals of the photodetector is greater than a threshold ensuring satisfactory operation of the device. Photodetector voltage SubPV is very slightly lower than reference voltage $V_{REF}$ in the embodiments illustrated in FIGS. 1 and 2.

In a preferred embodiment, transistor 4 is a field effect transistor having one source/drain electrode directly or indirectly connected to photodiode 1 and the other source/drain electrode directly or indirectly connected to readout circuitry 2.

If transistor 4 is a field effect transistor, the source/drain electrode of transistor 4 is formed from a doped semiconductor material having an opposite type of conductivity from that of the electrode associated with photodetector 1. Thus, in the two associated electrodes, one is of P-conductivity type and the other of N-conductivity type.

In other words, in the case where transistor 4 is of pMOS type, its source and drain electrodes are P-doped. The pMOS transistor is coupled to the photodetector electrode which is N-doped, i.e. the cathode. In a particular embodiment, the cathode of photodetector 1 is directly connected to readout circuitry 2 by means of a pMOS transistor.

In the case where the transistor is of nMOS type, its source and drain electrodes are N-doped. The nMOS transistor is coupled to the photo-detector electrode which is P-doped, i.e. the anode of photodetector 1. In a particular embodiment, the anode of photodetector 1 is directly connected to the readout circuitry by means of an nMOS transistor.

When readout circuitry 2 is operating normally, it supplies a predefined reference voltage $V_{REF}$ on its input terminal for the purposes of biasing photodetector 1. Reference voltage $V_{REF}$ is applied to anti-blooming circuit 3 and therefore to transistor 4. The reference voltage or a voltage representative of the latter is applied to photodetector 1. Biasing of photodetector 1 enables the latter to deliver a current representative of the lighting of the observed scene. The current is stored and analysed by readout circuitry 2.

To obtain correct operation of the device, transistor 4 lets the current flow between photodetector 1 and readout circuitry 2. The control electrode of transistor 4 is biased so as to enable flow of the current when readout circuitry 2 is intact and when it biases the photodetector in the selected range. An operating voltage $V_{POL}$ is applied to the gate of transistor 4 to define an on state and an off state.

It is interesting to use the expected value of voltage $V_{REF}$ as reference point to fix the off or on state of transistor 4. The value of operating voltage $V_{POL}$ imposed on the control electrode of transistor 4 is fixed with respect to the voltages applied on the other electrodes and mainly with respect to reference voltage $V_{REF}$ supplied on input of readout circuitry 2.

Operating voltage $V_{POL}$ is defined with respect to reference voltage $V_{REF}$ or a voltage close to $V_{REF}$ to have a transistor 4 that is turned-on when readout circuitry 2 delivers a sufficient voltage to perform the required biasing of photodetector 1.

As an example of the embodiments of FIGS. 1 and 2, if reference voltage $V_{REF}$ is the minimum voltage that performs the required biasing of photo-detector 1, operating voltage $V_{POL}$ is defined with respect to reference voltage $V_{REF}$ to have a transistor 4 that is turned-on when readout circuitry 2 delivers at least reference voltage $V_{REF}$. Transistor 4 is then turned-off if the voltage delivered on output of readout circuitry 2 is lower than reference voltage $V_{REF}$.

In other words, operating voltage $V_{POL}$ is defined such as to have a transistor 4 that is turned-on if the voltage difference at the terminals of the photo-detector is sufficient to obtain the required biasing.

In the case of an NIP photodiode associated with a pMOS transistor, voltage SubPV is lower than operating voltage $V_{POL}$ which is itself lower than reference voltage $V_{REF}$.

Transistor 4 operates as a closed switch when photodetector 1 is biased in the required range, here reverse-biased. The field effect transistor is on when the absolute value of the voltage $V_{GS}$ between the gate and source is higher than the absolute voltage of the threshold voltage of the pMOS transistor ($|V_{GS}|>|V_{th}|$). Operating voltage $V_{POL}$ is therefore less than the sum of reference voltage $V_{REF}$ and threshold voltage ($V_{POL}<V_{REF}+V_{th}$).

In a circuitry with an nMOS transistor and a P/N photodiode, distribution of the voltages is reversed. Operating voltage $V_{POL}$ is higher than reference voltage by a threshold voltage ($V_{POL}>V_{REF}+V_{th}$).

In the case where the detection circuit is faulty due to a technological fabrication problem or following an electrostatic discharge, the voltage applied to photodetector 1 by means of readout circuitry 2 is no longer within an authorized range. In order to avoid photodetector 1 from being biased outside the required range, for example forward-biased, and a parasite current from being injected into the substrate comprising the photodetector, anti-blooming module 3 prevents any current flow.

If a technological problem occurs during production of readout circuitry 2, the latter is no longer able to provide a sufficient reference voltage $V_{REF}$. The voltage difference between the input of readout circuitry 2 and voltage SubPV is no longer sufficient to perform biasing of photodetector in the required range, for example to perform reverse biasing of photodetector 1. Forward biasing of the photodetector will cause a current to flow in the substrate containing the photodetector.

As the voltage difference between the control electrode and the input of readout circuitry 2 is no longer sufficient in absolute value to have a transistor that is on, transistor 4 is turned off which prevents flow of current to the photo-detector. Transistor 4 acts as an open switch.

Transistor 4 is therefore arranged to operate as a closed switch when readout circuitry 2 performs biasing of the photodetector in a predefined voltage range and as an open switch when the readout circuitry supplies a voltage which would lead to forward biasing of the photodiode or a voltage that is insufficient to work under satisfactory conditions. This second case corresponds for example to malfunctioning of the readout circuitry or to an excessive accumulation of charges in the integration capacitor which results in a modification of the voltage on input of circuitry 2. Transistor 4 prevents the modification of the voltage on input of the circuitry 2 from being sufficient to make photodetector 1 go outside its authorized voltage range.

The bias applied to the control electrode of transistor 4 is configured in such a way as to form a closed switch when the voltage difference at the terminals of the photodetector is within the selected range. Current flow then takes place between the photodetector and readout circuitry 2 via transistor 4. The direction of the current varies according to the configuration of the circuit. The bias applied to the control electrode of transistor 4 is also configured in such a way as to form an open switch when the voltage difference at the terminals of the photodetector is outside the selected range. This configuration prevents flow of a current in the opposite direction to the previous case and/or supply of a current which is not representative of the observed scene.

If transistor 4 is a pMOS transistor, bias voltage $V_{POL}$ applied to the gate electrode of transistor 4 is lower than the reference voltage by a voltage that is equal to the threshold voltage under normal conditions of use. In the case of a nMOS transistor, the bias voltage is higher than $V_{REF}$ by a threshold voltage. Transistor 4 turns off as soon as the input of readout circuitry 2 is no longer equal to reference voltage $V_{REF}$. In an alternative embodiment, a different voltage from reference voltage $V_{REF}$ can be chosen.

In advantageous manner, the voltage applied to the control electrode is chosen such as to ensure that only a reverse bias is obtained at the terminals of photodetector 1. In other words, the voltage applied to the control electrode of transistor 4 enables a current to flow between photo-detector 1 and readout circuitry 2 when photodetector 1 is reverse-biased and prevents the current from flowing in the other cases. Photodetector voltage SubPV is fixed with respect to reference voltage $V_{REF}$ so as to have a photodetector delivering a current signal representative of the lighting of the observed scene.

In a preferred embodiment, the substrate or well of transistor 4 is biased to a voltage that is higher than that of the source electrode in the case of a pMOS transistor or that is lower than that of the source electrode in the case of an nMOS transistor by means of a substrate connector. In this embodiment, if a carrier current exists, the latter will be directed via the substrate connector to the voltage source which biases the substrate or well.

In an alternative embodiment, a plurality of detection circuits are produced so as to form a detection matrix. Photodetectors 1 are formed on one and the same substrate. Depending on the embodiments, the anodes or cathodes of photodetectors 1 are all connected to the same voltage node, for example photodetector voltage SubPV.

Each photodetector 1 is coupled to a readout circuitry 2 by means of a specific transistor 4 of the associated anti-blooming circuit 3. Each photodetector 1 is biased between the voltage defined by readout circuitry 2 and voltage SubPV. Each anti-blooming circuit 3 is associated with an operating voltage $V_{POL}$.

In advantageous manner, to have a compact device, the same reference voltage is applied by all the readout circuits 2, as is the same operating voltage $V_{POL}$. The biasing conditions are therefore normally identical for all the photo-detectors 1 and all the transistors 4. Operating voltage $V_{POL}$ is defined according to the criteria set out in the foregoing.

In this embodiment, if a readout circuitry 2 is faulty, no current is flowing between readout circuitry 2 and photodetector 1. No parasite current is therefore injected in the substrate and the neighbouring photodetectors 1 do not deliver any more current than normally, i.e. they are not bloomed. The possibility of excluding the faulty pixel therefore exists simply by means of an additional transistor.

In a privileged embodiment which can be combined with the previous embodiments, to prevent transistor 4 from disturbing operation of the detection circuit, it is advantageous to make transistor 4 operate under linear operating conditions and to avoid saturation operating conditions. In this way, the current delivered by photodetector 1 is totally retransmitted by transistor 4 without the production of artefacts at the input of the read circuit.

To foster operation of transistor 4 under linear conditions, it is advantageous to produce a transistor 4 having a large gate width. Under these conditions, it is also advantageous to produce a gate of small length in order to keep a device occupying a small surface. It is therefore advantageous to form a transistor 4 presenting a very high gate width/length ratio.

In a particular embodiment which can be combined with the previous embodiments, transistor 4 is asymmetric. The electric contact of the electrode which is associated with the photodetector is farther away from the gate electrode than the electric contact of the other electrode. The transistor electrode which is connected to the photodetector is more extended than the electrode which is connected to readout circuitry 2. An electrode is more extended when its contact pads are farther away from the gate than the contact pads of the other electrode. The use of a transistor with an extended drain electrode on the side where the photodiode is located enables a resistance to be created at the level of the considered drain electrode. This additional resistance of the drain electrode prevents the current from flowing via the channel and resulting in breakdown of the gate oxide in the readout circuitry. This architecture enhances flow of the current via the PIN junction diode which is present in the transistor.

In advantageous manner, the substrate connection of the transistor is formed in immediate proximity to the drain electrode for a pMOS or nMOS transistor. In this way, the diode between the substrate and the drain electrode is enhanced. The substrate connection is preferably biased to a higher voltage than reference voltage $V_{REF}$ for a pMOS transistor. In advantageous manner, the substrate connection is subjected to the voltage Vdda of the circuit. In the case of an nMOS transistor and a diode of opposite type, the distribution of the voltages is reversed.

Operating voltage $V_{POL}$ is applied to the gate electrode of transistor 4. This operating voltage $V_{POL}$ enables flow of the current between photodetector 1 and readout circuitry 2. In advantageous manner, operating voltage $V_{POL}$ enables transistor 4 to be made to operate in its linear range.

In the case where readout circuitry 2 is formed by a capacitive transimpedance amplifier (FIG. 1), it comprises an amplifier 5 with a first input coupled to transistor 4 and a second input on which reference voltage $V_{REF}$ is applied. An integration capacitor 6 is negative feedback connected between an output and the first input of amplifier 5.

In the case where readout circuitry 2 is formed by a buffered direct injection module (FIG. 2), an input of an amplifier 5 is connected to transistor 4 and the output of the latter is connected to the gate electrode of a readout transistor 7. A source/drain electrode of readout transistor 7 is connected to the common node between transistor 4 and amplifier 5. The other source/drain electrode is connected to the output of the readout circuitry.

Although operation of the transistor 4 has been described with a field effect transistor, it can also be envisaged to use a bipolar transistor. It is nevertheless more advantageous to use a field effect transistor, as the latter is more compact and presents a lower consumption.

The invention claimed is:

1. A detection circuit comprising:
   a readout circuitry configured to apply a reference voltage on an input terminal, and
   a photodiode coupled to the input terminal of the readout circuitry to be biased,
   wherein the photodiode and the input terminal of the readout circuitry are coupled by means of a transistor configured as an anti-blooming circuit and biased to operate as a closed switch when the readout circuitry biases the photodiode in a predefined range and to operate as an open switch in other cases, and
   wherein a voltage difference between the reference voltage on the input terminal of the readout circuitry and a voltage applied to a command terminal of the transistor causes switching of the transistor between an open switch and a closed switch.

2. The circuit according to claim 1, wherein the readout circuitry is a capacitive transimpedance amplifier.

3. The circuit according to claim 1, wherein the readout circuitry is a buffered direct injection module.

4. The circuit according to claim 1, wherein an input terminal of the photodiode is applied with a biasing voltage, the biasing voltage being a function of electrical charges provided by the photodiode and stored by the readout circuitry.

5. A detection circuit comprising:
   a readout circuitry configured to apply a reference voltage on an input terminal, and
   a photodiode coupled to the input terminal of the readout circuitry to be biased,
   wherein the photodiode and the input terminal of the readout circuitry are coupled by means of a transistor configured as an anti-blooming circuit and biased to operate as a closed switch when the readout circuitry reverse biases the photodiode and to operate as an open switch in other cases, and
   wherein a voltage difference between the reference voltage on the input terminal of the readout circuitry and a voltage applied to a command terminal of the transistor causes switching of the transistor between an open switch and a closed switch.

6. The circuit according to claim 5, wherein an input terminal of the photodiode is applied with a biasing voltage, the biasing voltage being a function of electrical charges provided by the photodiode and stored by the readout circuitry.

7. The circuit according to claim 5, wherein the readout circuitry is a capacitive transimpedance amplifier.

8. The circuit according to claim 5, wherein the readout circuitry is a buffered direct injection module.

9. A detection circuit comprising:
   a readout circuitry configured to apply a reference voltage on an input terminal, and a photodiode coupled to the input terminal of the readout circuitry to be biased, wherein the photodiode and the input terminal of the readout circuitry are coupled by means of a transistor configured as an anti-blooming circuit and biased to operate as a closed switch when the readout circuitry biases the photodiode in a predefined range and to operate as an open switch in other cases, and wherein an anode of the photodiode is connected to the readout circuitry and the transistor is a PMOS transistor.

10. The circuit according to claim 9, wherein an input terminal of the photodiode is applied with a biasing voltage, the biasing voltage being a function of electrical charges provided by the photodiode and stored by the readout circuitry.

11. The circuit according to claim 9, wherein the readout circuitry is a capacitive transimpedance amplifier.

12. The circuit according to claim 9, wherein the readout circuitry is a buffered direct injection module.

13. A detection circuit comprising:

a readout circuitry configured to apply a reference voltage on an input terminal, and a photodiode coupled to the input terminal of the readout circuitry to be biased, wherein the photodiode and the input terminal of the readout circuitry are coupled by means of a transistor configured as an anti-blooming circuit and biased to operate as a closed switch when the readout circuitry reverse biases the photodiode and to operate as an open switch in other cases, and wherein an anode of the photodiode is connected to the readout circuitry and the transistor is a PMOS transistor.

14. The circuit according to claim 13, wherein an input terminal of the photodiode is applied with a biasing voltage, the biasing voltage being a function of electrical charges provided by the photodiode and stored by the readout circuitry.

15. The circuit according to claim 13, wherein the readout circuitry is a capacitive transimpedance amplifier.

16. The circuit according to claim 13, wherein the readout circuitry is a buffered direct injection module.

17. A detection circuit comprising:

a photodiode configured for providing a current representative of an observed scene, a first voltage source applying a first biasing voltage on a first terminal of the photodiode, a readout circuitry configured for storing the current provided by the photodiode and including an input terminal configured for providing a second biasing voltage on a second terminal of the photodiode, and a transistor connecting the photodiode to the readout circuitry and configured so as operate as a closed switch when the readout circuitry biases the photodiode in a first range of voltage and to operate as an open switch in the other cases.

18. The circuit according to claim 17, wherein an input terminal of the photodiode is applied with a biasing voltage, the biasing voltage being a function of electrical charges provided by the photodiode and stored by the readout circuitry.

19. The circuit according to claim 17, wherein the readout circuitry is a capacitive transimpedance amplifier.

20. The circuit according to claim 17, wherein the readout circuitry is a buffered direct injection module.

* * * * *